(12) United States Patent
Zhang et al.

(10) Patent No.: US 9,432,880 B2
(45) Date of Patent: Aug. 30, 2016

(54) INTRA-FREQUENCY LOAD BALANCING METHOD AND APPARATUS THEREOF

(75) Inventors: Zhang Zhang, Beijing (CN); Jinhua Liu, Beijing (CN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 347 days.

(21) Appl. No.: 14/111,791

(22) PCT Filed: Feb. 29, 2012

(86) PCT No.: PCT/CN2012/071783
§ 371 (c)(1),
(2), (4) Date: Oct. 15, 2013

(87) PCT Pub. No.: WO2012/142876
PCT Pub. Date: Oct. 26, 2012

(65) Prior Publication Data
US 2014/0050089 A1  Feb. 20, 2014

(30) Foreign Application Priority Data

Apr. 22, 2011  (CN) .......................... 2011 1 0111187

(51) Int. Cl.
*H04W 28/08* (2009.01)
*H04B 7/04* (2006.01)
(Continued)

(52) U.S. Cl.
CPC ......... *H04W 28/085* (2013.01); *H04B 7/0404* (2013.01); *H04B 7/0617* (2013.01); *H04W 28/08* (2013.01); *H04B 7/0634* (2013.01); *H04W 16/28* (2013.01)

(58) Field of Classification Search
CPC . H04W 28/085; H04W 28/08; H04W 16/28; H04B 7/0404; H04B 7/0617
See application file for complete search history.

(56) References Cited

U.S. PATENT DOCUMENTS 6,324,401 B1  11/2001  De Hoz Garcia-Bellido et al.
6,853,333 B2   2/2005  Ericson et al.
(Continued)

FOREIGN PATENT DOCUMENTS

CN  1839647 A   9/2006
CN  102014435 A  4/2011
EP  1677564 A1  7/2006

OTHER PUBLICATIONS

3rd Generation Partnership Project, "Uplink Tx Diversity for HSPA*", RP-090987, Sep. 15, 2009, pp. 1-5, Release 10, [retrieved on Oct. 16, 2013], retrieved from internet: http://www.3gpp.org/ftp/Specs/html-info/FeatureOrStudyItemFile-450014.htm.

(Continued)

*Primary Examiner* — Alpus H Hsu
*Assistant Examiner* — Anthony Luo
(74) *Attorney, Agent, or Firm* — Patents on Demand P.A.; Brian K. Buchheit; Scott M. Garrett

(57) ABSTRACT

The present disclosure provides an uplink intra-frequency load balancing method. The uplink intra-frequency load balancing can be performed by adjusting a beam direction of a User Equipment UE. For each of UEs, the method comprises steps of: determining a cell load level of each cell based on an uplink load measurement received from base stations of a plurality of cells; determining a beam-forming capability of the UE based on a beam-forming gain of the UE; and calculating a cell balancing parameter for each of the plurality of cells, according to a common pilot channel CPICH quality report measured by the UE, the cell load levels of the plurality of cells and the beam-forming capability of the UE, so as to determine a beam-forming control cell towards which the beam direction of the UE is directed, the beam-forming control cell being a cell which has an optimal cell balancing parameter among the plurality of cells. The present disclosure further provides, for a UE which supports a CLBF mode but is not in the CLBF mode, a method for selectively activating the CLBF mode so as to enhance the effect of load balancing. The present further provides an uplink intra-frequency load balancing apparatus.

20 Claims, 2 Drawing Sheets

(51) Int. Cl.
  *H04B 7/06* (2006.01)
  *H04W 16/28* (2009.01)

(56) References Cited

U.S. PATENT DOCUMENTS

| | | | | |
|---|---|---|---|---|
| 8,385,937 | B2* | 2/2013 | Vakil | H04W 16/04 455/453 |
| 2006/0142021 | A1 | 6/2006 | Muechenheim et al. | |
| 2006/0142201 | A1 | 6/2006 | Lewis et al. | |
| 2007/0133479 | A1* | 6/2007 | Montojo | H04W 52/0216 370/335 |
| 2007/0225015 | A1* | 9/2007 | Mueckenheim | H04L 12/5693 455/453 |
| 2009/0022170 | A1* | 1/2009 | Mehta | H04W 52/286 370/410 |
| 2009/0163199 | A1* | 6/2009 | Kazmi | H04L 1/0026 455/425 |
| 2009/0197549 | A1* | 8/2009 | Ben-Ayun | H04B 7/0811 455/140 |
| 2009/0270103 | A1* | 10/2009 | Pani | H04W 36/0083 455/436 |
| 2011/0255514 | A1* | 10/2011 | Olofsson | H04W 72/0426 370/331 |

OTHER PUBLICATIONS

Kemeng, Y., et al., "An Adaptive Soft Handover Scheme Using Fuzzy Load Balancing for WCDMA Systems", The Open University's repository of research publications and other research outputs, Proceedings of the IASTED International Conference Networks and Communication Systems, Mar. 29, 2006, pp. 114-119, Open Research Online.

3rd Generation Partnership Project, "3rd Generation Partnership Project; Technical Specification Group Radio Access Network; Physical layer—Measurements (FDD) (Release 8)", Technical Specification, 3GPP TS 25.215 V8.1.0, May 1, 2008, pp. 1-23, Release 8, 3GPP, France.

3rd Generation Partnership Project, 3rd Generation Partnership Project; Technical Specification Group Radio Access Network; Radio Resource Control (RRC); Protocol specification (Release 10), Technical Specification, 3GPP TS 25.331 V10.1.0, Sep. 1, 2010, pp. 1657-1684, Release 10, Section 14.1, 3GPP, France.

Holma, H., et al., "WCDMA for UMTS—Radio Access for Third Generation Mobile Communications", Sep. 14, 2004, p. 258, Wiley.

Osseiran, A., et al., "Smart Antennas in a WCDMA Radio Network System: Modeling and Evaluations", IEEE Transactions on Antennas and Propagation, Nov. 1, 2006, pp. 3302-3316, vol. 54, No. 11, IEEE.

Qualcomm Incorporated, "On the Benefits of Uplink Closed Loop Transmit Diversity", 3GPP TSG RAN WG1 Meeting #62, Madrid, Spain, Aug. 23, 2010, pp. 1-17, R1-104737, 3GPP.

* cited by examiner

INTRA-FREQUENCY LOAD BALANCING METHOD AND APPARATUS THEREOF

TECHNICAL FIELD

The present disclosure relates to load balancing in the communication network, and particularly to a method for implementing uplink intra-frequency load balancing by changing a beam-forming control cell of a User Equipment (UE) in a CLBF mode, and an apparatus for performing such a method.

BACKGROUND

Uplink Beam Forming

Currently, the Third Generation Partnership Project (3GPP) is evaluating the potential benefits of uplink transmit diversity in the context of High-Speed Uplink Packet Access (HSUPA) (see 3GPP Tdoc RP-090987, 3GPP Work Item Description: Uplink Tx Diversity for HSPA, which is incorporated herein by reference). With uplink transmit diversity UEs that are equipped with two or more transmit antennas are capable of utilizing all of them. This is achieved by multiplying the input signal s(t) with a complex weight vector $W=[w_1, w_2, \ldots, w_i, \ldots, w_M]$, while the weight vector can also be referred as the precoding vector. Referring to FIG. 1, where a schematic diagram for the uplink transmit diversity is shown. Note that i=1 . . . M where M denotes the number of transmit antennas. The rationale behind uplink transmit diversity is to adapt the weights so that the user and network performance is maximized. Depending on UE implementation the antenna weights may be associated with different constraints.

Uplink beam forming (BF) is one kind of uplink transmit diversity where the UE at a given time-instance can transmit from more than one antenna simultaneously.

Furthermore, the uplink BF can be divided into two categories depending on whether there is explicit feedback from Node B:

Open loop BF (OLBF): the UE autonomously decides the antenna weights. To select the weights the UE may monitor the already existing feedback channels (that are transmitted for other purposes) such as F-DPCH.

Close loop BF (CLBF): the Node-B provides an explicit feedback to the UE stating which weights that the UE should use when transmitting the signal. This may require that a new feedback channel is introduced.

During soft handover, the UE may be simultaneously connected to multiple cells, all of which may be added into the active set of the UE, and one cell responsible for scheduling the UE refers to a serving cell of the UE. For CLBF, one cell in the active set will be responsible for generating and determining the weights (or the precoding vector) during soft handover so as to steer a beam direction of the UE in the CLBF mode to the cell. In this disclosure, such a cell is denoted as a BF control cell. The beam direction of the UE in CLBF mode is directed towards the BF control cell, i.e. a base station antenna of the BF control cell. The BF control cell may be either the serving cell or the non-serving cell.

Uplink Load Balancing

In a real network, the traffic load may be quite different in different cells, either in uplink or in downlink, or both. This leads to that the system performance may be limited by a few highly loaded cells. One solution to this is load balancing or load sharing. In uplink, the load balancing can be performed either intra frequency, or inter frequency (or even inter RAT).

Intra frequency uplink load balancing: taking uplink load (or interference) situation into account in the criteria for triggering soft handover (or cell (re)selection) can help to decrease UE Tx power consumption and also to some extent balance the uplink load (see Yang, Kemeng; Qiu, Bin and Dooley, Laurence S. "An Adaptive Soft Handover Scheme Using Fuzzy Load Balancing for WCDMA Systems", http://oro.open.ac.uk/11917/1/KY_NCS06.pdf; and U.S. Pat. No. 6,324,401, "soft handover method used in a CDMA mobile communication system and corresponding device", http://www.freepatentsonline.com/6324401.html, both of which are incorporated herein by reference). However, the benefit in load balancing is fairly limited when without BF. This is because UEs in soft handover are already communicating with multiple cells in their active set, i.e. the uplink load that they generate is already shared between these cells. To further balance the uplink load, it is needed to add more cells in the active set. On the other hand, the cells out of the active set is at least 3 dB worse than the serving cell in the active set, i.e. the corresponding uplink load imbalance cannot be decreased to below 3 dB. This implies severe uplink load imbalance can still exist.

Inter frequency (or RAT) uplink load balancing: taking uplink load (or interference) situation into account in the criteria for triggering inter frequency (or RAT) handover or (re)selection (see Harri Holma, Antti Toskala, "WCDMA for UMTS—Radio Access For Third Generation Mobile Communications", third Edition). This is however not always possible if e.g. only one uplink carrier is configured or only one RAT is deployed by the operator. Moreover, even another RAT, e.g. GSM, is deployed, the operator may want the traffic stays on UMTS carrier as long as possible. The inter-frequency (or RAT) handover can result in interruption of data transmissions, which is also undesirable. Therefore, intra-frequency load balancing is still important.

BF may evidently improve spatial separation, which can enhance the effect of intra-frequency uplink load balancing by e.g. steering the beam to the less loaded cell. Till now, the uplink load balancing assisted by using the BF at the Node B side has been studied in U.S. Pat. No. 6,853,333B2, "Downlink load sharing by beam selection", http://www.freepatentsonline.com/6853333.html, and Jiayi Wu, John Bigham, et al, "Tilting and Beam-shaping for Traffic Load Balancing in WCDMA Network", both of which are incorporated herein by reference.

Intra Frequency Measurements and Reporting

In UMTS, intra-frequency measurements rely on quality measurements performed from the (primary) common pilot channel (CPICH). The quantities defined to be measured by the terminal from the CPICH are as follows (see 3GPP TS 25.215, "Physical layer—Measurements (FDD) (Release 8)", v8.1.0, which is incorporated herein by reference):

Received Signal Code Power (RSCP), which is the received power on one code after de-spreading, defined on the pilot symbols;

Received Signal Strength Indicator (RSSI), which is the wideband received power within the channel bandwidth;

Ec/NO, representing the received signal code power divided by the total received power in the channel bandwidth, which is defined as RSCP/RSSI.

The measured CPICH quality can be reported to RNC either periodically or event triggered, based on which intra frequency mobility (soft handover, serving cell change, cell selection and reselection etc.) is implemented. A series of intra-frequency reporting events with respect to any of the measurement quantities above are defined in 3GPP TS 25.331, "Radio Resource Control (RRC); Protocol specification (Release 10)", v10.1.0 (which is incorporated herein by reference), to support event triggered measurement report.

Besides, mechanisms are provided for modifying intra-frequency measurement reporting behavior for event triggered measurement report (3GPP TS 25.331, "Radio Resource Control (RRC); Protocol specification (Release 10)", v10.1.0):

Hysteresis: To limit the amount of event-triggered reports, a hysteresis parameter may be connected with each reporting event Time-to-trigger: to limit the measurement signaling load, a time-to-trigger parameter could be connected with each reporting event Cell individual offset (CIO): For each cell that the UE is monitoring, an offset can be assigned with in-band signaling. The offset is added to the measurement quantity before the UE evaluates it if an event has occurred (with event triggered measurement report). When with CIO, intra-frequency mobility between two cells (i.e. Cell a and Cell b) is based on the comparison of CPICH quality plus CIO as below:

$$(\text{Quality}_{CPICHa}+CIO_a)-(\text{Quality}_{CPICHb}+CIO_b)= (\text{Quality}_{CPICHa}-\text{Quality}_{CPICHb})+(CIO_a-CIO_b) \quad (1)$$

wherein, $\text{Quality}_{CPICHa}$ denotes a CPICH quality for Cell a; $\text{Quality}_{CPICHb}$ denotes a CPICH quality for Cell b; $CIO_a$ denotes a CIO of Cell a; and $CIO_b$ denotes CIO for Cell b. When the result of Formula (1) is positive, this means the quality of Cell a is better than that of Cell b, and the UE should be connected to Cell a. When the result of Formula (1) is negative, this indicates that the quality of Cell b is better than that of Cell a, and the UE should be connected to Cell b. If the UE is currently connected to Cell a, and the quality of Cell b is better than that of Cell a, a change of the serving cell may be triggered. If the UE is currently connected to Cell a, and the quality of Cell a is better than that of Cell b, no change of the serving cell would be triggered.

The benefit of intra-frequency uplink load balancing is limited without BF. Inter-frequency (or RAT) uplink load balancing is not always possible. Obviously, when using BF, the uplink load may be better balanced by implementing intra frequency load balancing. However, there is no such a solution on how to improve the uplink load balancing by using the BF at the UE side. At the Node B side, since there are limited antennas at the Node B, the number of beams that may be formed is also limited, which would result in the benefit of the BF in improving the uplink load balancing performance. This is because only a limited number of UEs may obtain spatial separation, which is well enough to contribute to the uplink load balancing.

SUMMARY

The present disclosure enables the network to control which and how much UEs are allowed to contribute to uplink load balancing based on UE's beam forming capability and the uplink system load situation, including related algorithm and signaling.

According to an aspect of the present disclosure, an uplink intra-frequency load balancing method is provided. The uplink intra-frequency load balancing can be performed by adjusting a beam direction of a User Equipment UE. For each of UEs, the method comprises steps of: a) determining a cell load level of each cell based on an uplink load measurement received from base stations of a plurality of cells; b) determining a beam-forming capability of the UE based on a beam-forming gain of the UE; and c) calculating a cell balancing parameter for each of the plurality of cells, according to a common pilot channel CPICH quality report measured by the UE, the cell load levels of the plurality of cells and the beam-forming capability of the UE, so as to determine a beam-forming control cell towards which the beam direction of the UE is directed, the beam-forming control cell being a cell which has an optimal cell balancing parameter among the plurality of cells.

Preferably, the uplink load measurement is Received Total Wide Band Power RTWP, Rise over Thermal RoT, or load factor.

Preferably, the cell load level is estimated based on a target load and the uplink load measurement received from the base station.

Preferably, the cell load level is estimated based on a difference between the target load and the uplink load measurement received from the base station.

Preferably, the step c) comprises: multiplying a cell specific offset CSO representing the cell load level of the cell with a relative UE specific offset USO representing the beam-forming capability of the UE to obtain a product, for each of the plurality of cells; summing the CPICH quality report $Q_{CPICH}$ of the cell measured by the UE and the obtained product as the cell balancing parameter, wherein the beam-forming control cell is a cell which has a largest cell balancing parameter among the plurality of cells.

Preferably, the beam-forming capability of the UE is determined based on the beam-forming gain of the UE, and the relative USO is then determined according to the beam-forming capability of the UE and a determination of whether the UE is in a close loop beam-forming CLBF mode.

Preferably, the relative USO is calculated in real-time or pre-calculated.

Preferably, the relative USO is calculated as $k(\text{flag}_{BCLBF}, \text{Gain}_{BF})$, wherein $\text{Gain}_{BF}$ represents the beam-forming gain, $k(*, \text{Gain}_{BF})$ is a monotone non-decreasing function of $\text{Gain}_B$, whose range domain is [0, 1]; when the UE is in the CLBF mode, let $\text{flag}_{BCLBF}$ be 1; otherwise, let $\text{flag}_{BCLBF}$ be 0.

Preferably, the relative USO is calculated as $\text{flag}_{BCLBF} \times (1-1/M_{and})^n$, wherein $M_{ant}$ represents the number of transmitting antennas of the UE, n is a system configurable parameter; when the UE is in the CLBF mode, let $\text{flag}_{BCLBF}$ be 1; otherwise, let $\text{flag}_{BCLBF}$ be 0.

Preferably, the step c) comprises: representing the cell load level of the cell with a cell specific offset CSO, and representing the beam-forming capability of the UE with an absolute UE specific offset USO, performing operations as follows for two cells out of the plurality of cells, so as to select the cell which has the optimal cell balancing parameter: calculating a relative cell balancing parameter of a Cell a with respect to a Cell b:

$$(Q_a-Q_b)+\text{sign}(CSO_a-CSO_b) \times \min(\text{abs}(CSO_a-CSO_b), USO)$$

wherein $Q_a$ represents CPICH quality of the Cell a, and $Q_b$ represents CPICH quality of the Cell b; $CSO_a$ represents CSO of the Cell a, and $CSO_b$ represents CSO of the Cell b;

"sign" represents "+/−", "min" represents that a minimum value is taken, and "abs" represents that an absolute value is taken, if the relative cell balancing parameter of the Cell a with respect to the Cell b is positive, it means that the cell balancing parameter of the Cell a is more optimal than that of the Cell b, continuing to calculate a relative cell balancing parameter of the Cell a relative to another cell; and if the relative cell balancing parameter of the Cell a with respect to the Cell b is negative, it means that the cell balancing parameter of the Cell b is more optimal than that of the Cell a, continuing to calculate a relative cell balancing parameter of the Cell b relative to another cell, until the cell which has the optimal cell balancing parameter is selected.

Preferably, the beam-forming capability of the UE is determined based on the beam-forming gain of the UE, and the absolute USO is then determined according to the beam-forming capability of the UE and a determination of whether the UE is in a close loop beam-forming CLBF mode.

Preferably, the absolute USO is calculated in real-time or pre-calculated.

Preferably, the absolute USO is calculated as $f(\text{flag}_{BCLBF}, \text{Gain}_{BF})$, wherein $\text{Gain}_{BF}$ represents the beam-forming gain, $f(*, \text{Gain}_{BF})$ is a monotone non-decreasing function of $\text{Gain}_{BF}$; when the UE is in the CLBF mode, let $\text{flag}_{BCLBF}$ be 1; otherwise, let $\text{flag}_{BCLBF}$ be 0.

Preferably, the absolute USO is calculated as $\text{flag}_{BCLBF} \times \min(\text{CSO}_{max}, -101 \text{ g } M_{ant})$, wherein "min" represents that a minimum value is taken; $M_{ant}$ represents the number of transmitting antennas of the UE; $\text{CSO}_{max}$ is a maximum absolute CSO, which is a system configurable parameter; when the UE is in the CLBF mode, let $\text{flag}_{BCLBF}$ be 1; otherwise, let $\text{flag}_{BCLBF}$ be 0.

Preferably, in a periodical trigger mode, the UE periodically transmits the CPICH quality report, in order to trigger the step of determining the beam-forming control cell.

Preferably, in an event trigger mode, the UE is notified of the cell load levels of the plurality of cells and the beam-forming capability of the UE, in order to monitor whether to trigger the step of determining the beam-forming control cell.

Preferably, the beam-forming capability of the UE depends on the beam-forming gain estimated based on the number of the transmitting antennas of the UE and/or a pre-coding scheme.

Preferably, the larger the beam-forming gain is, the stronger the beam-forming capability of the UE is.

Preferably, the method further comprises: activating the CLBF mode according to at least one of steps of: activating a UE with a higher beam-forming gain, and activating the CLBF mode for at most m UEs in every t seconds, wherein t and m are configurable parameters, for a UE which supports the CLBF mode but is not in the CLBF mode; and if the CLBF mode is activated, the UE supporting the CLBF mode can re-determine the beam-forming control cell.

Preferably, the method is performed at a radio network controller RNC, each of UEs notifying the RNC of the measured CPICH quality report and the determined beam-forming capability of the UE.

Preferably, the method is performed at each of UEs, a radio network controller RNC notifying each of the UEs of cell load levels of the plurality of cells.

According to another aspect of the present disclosure, an uplink intra-frequency load balancing apparatus is provided. The uplink intra-frequency load balancing can be performed by adjusting a beam direction of a User Equipment UE. The apparatus comprises: a first determination unit, configured for determining a cell load level of each cell based on an uplink load measurement received from base stations of a plurality of cells; a second determination unit, configured for determining a beam-forming capability of the UE based on a beam-forming gain of the UE; and a calculation and determination unit, configured for calculating a cell balancing parameter for each of the plurality of cells, according to a common pilot channel CPICH quality report measured by the UE, the cell load levels of the plurality of cells and the beam-forming capability of the UE, so as to determine a beam-forming control cell towards which the beam direction of the UE is directed, the beam-forming control cell being a cell which has an optimal cell balancing parameter among the plurality of cells.

Preferably, the uplink load measurement is Received Total Wide Band Power RTWP, Rise over Thermal RoT, or load factor.

Preferably, the first determination unit estimates the cell load level based on a target load and the uplink load measurement received from the base station.

Preferably, the first determination unit estimates the cell load level based on a difference between the target load and the uplink load measurement received from the base station.

Preferably, the calculation and determination unit multiplies a cell specific offset CSO representing the cell load level of the cell with a relative UE specific offset USO representing the beam-forming capability of the UE to obtain a product, for each of the plurality of cells; sums the CPICH quality report $Q_{CPICH}$ of the cell measured by the UE and the obtained product as the cell balancing parameter, wherein the beam-forming control cell is a cell which has a largest cell balancing parameter among the plurality of cells.

Preferably, the second determination unit determines beam-forming capability of the UE based on the beam-forming gain of the UE, and determines the relative USO according to the beam-forming capability of the UE and a determination of whether the UE is in a close loop beam-forming CLBF mode.

Preferably, the relative USO is calculated in real-time or pre-calculated.

Preferably, the relative USO is calculated as $k(\text{flag}_{BCLBF}, \text{Gain}_{BF})$, wherein $\text{Gain}_{BF}$ represents the beam-forming gain, $k(*, \text{Gain}_{BF})$ is a monotone non-decreasing function of $\text{Gain}_{BF}$ whose range domain is [0, 1]; when the UE is in the CLBF mode, let $\text{flag}_{BCLBF}$ be 1; otherwise, let $\text{flag}_{BCLBF}$ be 0.

Preferably, the relative USO is calculated as $\text{flag}_{BCLBF} \times (1 - 1/M_{ant})^n$, wherein $M_{ant}$ represents the number of transmitting antennas of the UE, n is a system configurable parameter; when the UE is in the CLBF mode, let $\text{flag}_{BCLBF}$ be 1; otherwise, let $\text{flag}_{BCLBF}$ be 0.

Preferably, the calculation and determination unit represents the cell load level of the cell with a cell specific offset CSO and represents the beam-forming capability of the UE with an absolute UE specific offset USO; and performs operations as follows for two cells out of the plurality of cells, so as to select the cell which has the optimal cell balancing parameter: calculating a relative cell balancing parameter of a Cell a with respect to a Cell b:

$$(Q_a - Q_b) + \text{sign}(CSO_a - CSO_b) \times \min(\text{abs}(CSO_a - CSO_b), USO),$$

wherein $Q_a$ represents CPICH quality of the Cell a, and $Q_b$ represents CPICH quality of the Cell b; $CSO_a$ represents CSO of the Cell a, and $CSO_b$ represents CSO of the Cell b;

"sign" represents "+/−", "min" represents that a minimum value is taken, and "abs" represents that an absolute value is taken, if the relative cell balancing parameter of the Cell a with respect to the Cell b is positive, it means that the cell balancing parameter of the Cell a is more optimal than that of the Cell b, continuing to calculate a relative cell balancing parameter of the Cell a relative to another cell; and if the relative cell balancing parameter of the Cell a with respect to the Cell b is negative, it means that the cell balancing parameter of the Cell b is more optimal than that of the Cell a, continuing to calculate a relative cell balancing parameter of the Cell b relative to another cell, until the cell which has the optimal cell balancing parameter is selected.

Preferably, the second determination unit determines beam-forming capability of the UE based on the beam-forming gain of the UE, and then determines the absolute USO according to the beam-forming capability of the UE and a determination of whether the UE is in a close loop beam-forming CLBF mode.

Preferably, the absolute USO is calculated in real-time or pre-calculated.

Preferably, the absolute USO is calculated as $f(flag_{BCLBF}, Gain_{BF})$, wherein $Gain_{BF}$ represents the beam-forming gain, $f(*,Gain_{BF})$ is a monotone non-decreasing function of $Gain_{BF}$; when the UE is in the CLBF mode, let $flag_{BCLBF}$ be 1; otherwise, let $flag_{BCLBF}$ be 0.

Preferably, the absolute USO is calculated as $flag_{BCLBF} \times min(CSO_{max},-10 \lg M_{ant})$, wherein "min" represents that a minimum value is taken; $M_{ant}$ represents the number of transmitting antennas of the UE; $CSO_{max}$ is a maximum absolute CSO, which is a system configurable parameter; when the UE is in the CLBF mode, let $flag_{BCLBF}$ be 1; otherwise, let $flag_{BCLBF}$ be 0.

Preferably, in a periodical trigger mode, the UE periodically transmits the CPICH quality report, in order to trigger the step of determining the beam-forming control cell.

Preferably, in an event trigger mode, the UE is notified of the cell load levels of the plurality of cells and the beam-forming capability of the UE, in order to monitor whether to trigger the step of determining the beam-forming control cell.

Preferably, the beam-forming capability of the UE depends on the beam-forming gain estimated based on the number of the transmitting antennas of the UE and/or a pre-coding scheme.

Preferably, the larger the beam-forming gain is, the stronger the beam-forming capability of the UE is.

Preferably, the apparatus further comprises: an activation unit, configured for activating the CLBF mode according to at least one of steps of: activating a UE with a higher beam-forming gain, and activating the CLBF mode for at most m UEs in every n seconds, wherein m and n are configurable parameters, for a UE which supports the CLBF mode but is not in the CLBF mode; if the CLBF mode is activated, the UE supporting the CLBF mode can re-determine the beam-forming control cell.

Preferably, the apparatus is located at a radio network controller RNC, each of UEs notifying the RNC of the measured CPICH quality report and the determined beam-forming capability of the UE.

Preferably, the apparatus is located at each of UEs, a radio network controller RNC notifying each of the UEs of cell load levels of the plurality of cells.

BRIEF DESCRIPTION OF THE DRAWINGS

The above and other objects, features and advantages will be more apparent from the following description of embodiments with reference to the figures, in which.

DESCRIPTION OF THE EMBODIMENTS

The illustrative embodiments of the present invention will be detailed below with reference to the drawings. Although the illustrative embodiments take a WCDMA network as an example, it should be appreciated that the present invention is not limited to this. The illustrative embodiments are illustrative only, rather than limiting the scope of the present invention, and any solution employing the embodiments of the present invention should fall into the scope of the present invention. The present invention may be also applied in other networks as well, for instance, CDMA, TD-SCDMA, CDMA2000, LTE, and other interference shared networks.

Figure 1:
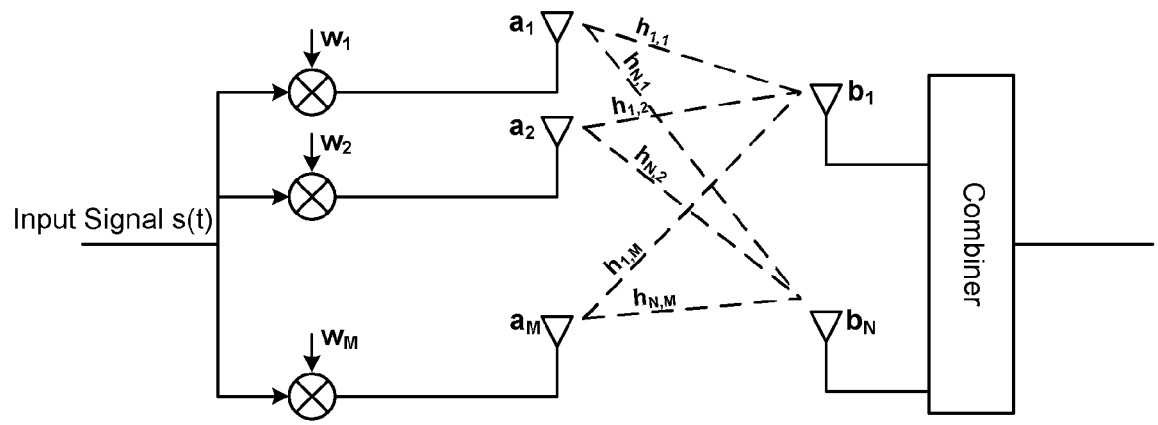
FIG. 1 schematically shows a diagram of uplink transmit diversity in a communication system.
Figure 2:
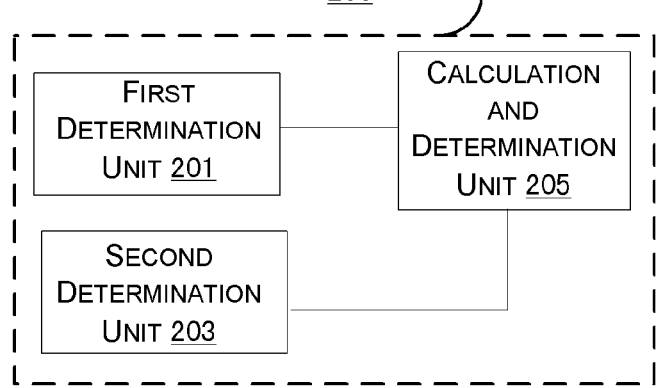
FIG. 2 shows a structural block diagram of an uplink intra-frequency load balancing apparatus according to an embodiment of the present invention.

Reference now is made to FIG. 2, which describes a structure of an uplink intra-frequency load balancing apparatus 200 according to an embodiment of the present invention. The apparatus 200 according to the embodiment of the present invention may change a beam direction of a UE in CLBF mode by changing a BF control cell of the UE, which is to steer the beam direction of the UE to a base station antenna of the BF control cell, thereby performing uplink intra-frequency load balancing.

The uplink intra-frequency load balancing apparatus 200 may comprise a first determination unit 201, configured for determining a cell load level of each cell based on an uplink load measurement received from base stations of a plurality of cells; a second determination unit 203, configured for determining a beam-forming capability of the UE based on a beam-forming gain of the UE; and a calculation and determination unit 205, configured for calculating a cell balancing parameter for each of the plurality of cells, according to a common pilot channel CPICH quality report measured by the UE, the cell load levels of the plurality of cells and the beam-forming capability of the UE, so as to determine a beam-forming control cell towards which the beam direction of the UE is directed, the beam-forming control cell being a cell which has an optimal cell balancing parameter among the plurality of cells.

Preferably, the uplink intra-frequency load balancing apparatus 200 may further comprises an activation unit (not shown), configured to: for a UE which supports the CLBF mode but is not in the CLBF mode, activate the CLBF mode when evident load imbalance exists according to at least one of steps of: activating a UE with a higher beam-forming gain, and activating the CLBF mode for at most m UEs in every n seconds, wherein m and n are configurable parameters; if the CLBF mode is activated, the UE supporting the CLBF mode can re-determine the beam-forming control cell.

Hereinafter, an uplink intra-frequency load balancing method performed by the uplink intra-frequency load balancing apparatus 200 according to an embodiment of the present invention will be described in combination with FIG. 3.

Figure 3:
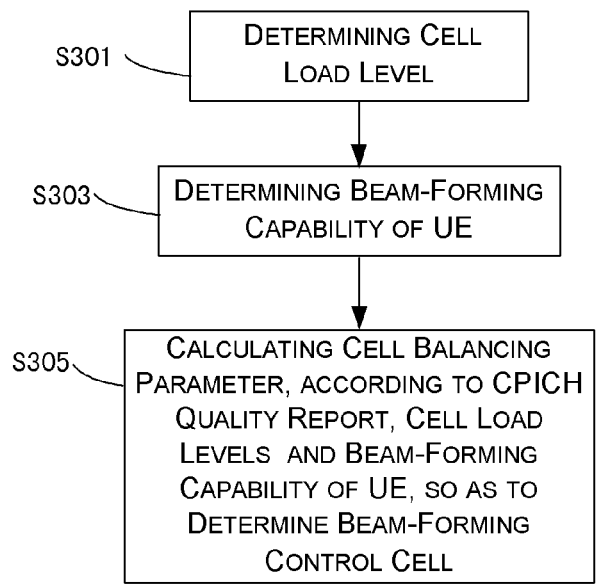
FIG. 3 shows a flowchart of an uplink intra-frequency load balancing method according to an embodiment of the present invention.

FIG. 3 shows a method 300 for performing uplink intra-frequency load balancing by changing a beam direction of a UE in CLBF mode according to the embodiment of the present invention.

At Step 301, Node Bs of a plurality of candidate cells may report an uplink load measurement of each candidate cell to the uplink intra-frequency load balancing apparatus 200. The uplink load measurement may be Received Total Wide Band Power (RTWP), Rise over Thermal (RoT), or load factor, etc. Then the first determination unit 201 in the uplink intra-frequency load balancing apparatus 200 may determine a cell load level CLl of each candidate cell based on the reported uplink load measurement and a target (i.e. desired) load in accordance with the following Formula (2):

$$CLl=f(\text{reported uplink load measurement}, \text{target load}) \quad (2)$$

As shown in Formula (2), the cell load level may have a certain function relationship with the reported uplink load measurement and the target load. In an example, the cell load level may be estimated based on a difference between the reported uplink load measurement and the target load. Specifically, the difference between the reported uplink load measurement and the target load may be used to obtain remaining available uplink load space of a cell (which may be updated by the cell in real time), which may be used to estimate the cell load level. However, it should be appreciated that the cell load level may be also estimated by means of other manners. Various manners for estimating the cell load level may be described in Harri Holma, Antti Toskala, "WCDMA for UMTS—Radio Access For Third Generation Mobile Communications", third Edition, which may be incorporated herein by reference.

The first determination unit 201 in the uplink intra-frequency load balancing apparatus 200 may set a quantity that can impact BF control cell change and/or intra-frequency mobility as well as event triggered measurement reporting, based on the cell load level denoted as CLl. The quantity may be hysteresis, cell individual offset (CIO) and time-to-trigger as specified in 3GPP TS 25.331, "Radio Resource Control (RRC); Protocol specification (Release 10)", v10.1.0. It should be noted that when the BF control cell of the UE is in a different cell from the serving cell of the UE, hysteresis, cell individual offset (CIO) and time-to-trigger of the BF control cell may be different from those of the serving cell. The description on a situation where the change of the serving cell occurs is omitted here since the present disclosure only relates to the change of the BF control cell.

In an embodiment of the present invention, cell specific offset (CSO) may represent cell load level (CLl). For example, CSO may be indicated as CLl being multiplied with a scale factor. The scale factor may be either fixed or dynamically adjusted. CSO may be CIO for intra-frequency mobility, or CIO dedicated to selecting or changing BF control cell. How to set CIO based on the cell load level is specifically described in Harri Holma, Antti Toskala, "WCDMA for UMTS—Radio Access For Third Generation Mobile Communications", third Edition, which is incorporated herein by reference.

As Step 303, the second determination unit 203 of the uplink intra-frequency load balancing apparatus 200 may determine a beam-forming capability of the UE based on a beam-forming gain of the UE.

Specifically, if the UE is capable of CLBF, or more specifically, the UE is currently in the CLBF mode, it may be conditionally only allowed for CLBF capable UEs (or UEs in CLBF mode) to contribute to uplink load balancing. That is, it is allowed to steer a beam direction of the UE to less loaded cells, so that the less loaded cell (i.e. BF control cell), to which the beam direction of the UE is steered, may be appropriately increased, so as to contribute to uplink load balancing. BF gain may be estimated based on a number of UE transmitting antennas and precoding schemes (which can be known from UE's category). The larger the BF gain is, the greater the BF capability of the UE is, i.e., in the more area the UE can contribute to load balancing.

The second determination unit 203 of the uplink intra-frequency load balancing apparatus 200 may calculate UE's hysteresis, special offset or time-to-trigger based on the determined beam-forming capability of the UE. For example, a USO of the UE may be calculated by means of a BF gain indicating the BF capability of the UE. The USO may be either an absolute offset or a relative offset. The absolute USO has a dimension as CSO, while the relative USO has no dimension and is between 0 and 1. There is no significant difference in using the absolute USO and the relative USO.

In an embodiment, the absolute USO may be calculated as $f(\text{flag}_{BCLBF}, \text{Gain}_{BF})$, wherein $\text{Gain}_{BF}$ represents the BF gain, $f(*, \text{Gain}_{BF})$ is a monotone non-decreasing function of $\text{Gain}_{BF}$. When the UE is in the CLBF mode, let $\text{flag}_{BCLBF}$ be 1; otherwise, let $\text{flag}_{BCLBF}$ be 0.

In another embodiment, the absolute USO may be calculated as $\text{flag}_{BCLBF} \times \min(CSO_{max}, -10 \lg M_{ant})$, wherein "min" represents that a minimum value is taken; $M_{ant}$ represents the number of transmitting antennas of the UE; $CSO_{max}$ is a maximum absolute CSO, which is a system configurable parameter; when the UE is in the CLBF mode, let $\text{flag}_{BCLBF}$ be 1; otherwise, let $\text{flag}_{BCLBF}$ be 0.

In yet another embodiment, the relative USO may calculated as $k(\text{flag}_{BCLBF}, \text{Gain}_{BF})$, wherein $\text{Gain}_{BF}$ represents the beam-forming gain, $k(*, \text{Gain}_{BF})$ is a monotone non-decreasing function of $\text{Gain}_{BF}$ whose range domain is [0, 1]. When the UE is in the CLBF mode, let $\text{flag}_{BCLBF}$ be 1; otherwise, let $\text{flag}_{BCLBF}$ be 0.

In further another embodiment, the relative USO may be calculated as $\text{flag}_{BCLBF} \times (1 - 1/M_{ant})^n$, wherein $M_{ant}$ represents the number of transmitting antennas of the UE, n is a system configurable parameter. When the UE is in the CLBF mode, let $\text{flag}_{BCLBF}$ be 1; otherwise, let $\text{flag}_{BCLBF}$ be 0.

The USO may be either calculated in real-time or pre-calculated, and then stored in a table.

At Step 305, the calculation and determination unit 205 in the uplink intra-frequency load balancing apparatus 200 may calculate a cell balancing parameter for each of the plurality of cells, according to a common pilot channel CPICH quality report measured by the UE, the cell load levels of the plurality of cells and the beam-forming capability of the UE, so as to determine a beam-forming control cell towards which the beam direction of the UE is directed. The beam-forming control cell is a cell which has an optimal cell balancing parameter among the plurality of cells. RNC may enhance the effect of intra-frequency uplink load balancing by steering the beam of the UE to the less loaded cell.

Specifically, in accordance with an embodiment of the present invention, determining a cell having an optimal cell balancing parameter based on USO and CSO determined based on the UE's BF capability may be different for absolute USO and relative USO, and may also depend on whether the measurement report is periodical or event triggered:

Absolute USO:

In a case where the measurement report is periodical, performing operations as follows for two cells out of the plurality of cells, so as to select a cell which has the optimal cell balancing parameter: calculating a relative cell balancing parameter of Cell a with respect to Cell b, a comparison between Cell a and Cell b may be determined via the following formula (3):

$$(Q_a-Q_b)+\text{sign}(CSO_a-CSO_b)\times\min(\text{abs}(CSO_a-CSO_b), USO) \quad (3)$$

wherein $Q_a$ represents CPICH quality of the Cell a, and $Q_b$ represents CPICH quality of the Cell b; $CSO_a$ represents CSO of the Cell a, and $CSO_b$ represents CSO of the Cell b; "sign" represents "+/−", "min" represents that a minimum value is taken, and "abs" represents that an absolute value is taken. If the relative cell balancing parameter of the Cell a with respect to the Cell b is positive, it means that the cell balancing parameter of the Cell a is more optimal than that of the Cell b, continuing to calculate a relative cell balancing parameter of the Cell a relative to another cell. If the relative cell balancing parameter of the Cell a with respect to the Cell b is negative, it means that the cell balancing parameter of the Cell b is more optimal than that of the Cell a, continuing to calculate a relative cell balancing parameter of the Cell b relative to another cell, until the cell which has the optimal cell balancing parameter is selected. For example, when Cell a is determined as an optimum cell based on a result of a comprehensive comparison, BF control cell change or uplink serving cell change from the current Cell b to Cell a may be triggered.

An absolute difference in CSO between two cells reflects the coverage difference change due to balancing a load difference between the cells. Formula (3) implies that this absolute difference should not exceed constraints given by the absolute USO, thereby regulating the level of load balancing that each UE should contribute to. The larger the absolute USO is, the more the UE should/could contributes to load balancing (but no more than the level given by the absolute difference in CSO).

When the BF control cell of the UE is different from the serving cell of the UE, the control cell of the UE may be changed by employing the embodiment of the present invention. In this case, it is needed to adopt a CSO specific for the serving cell change (e.g. CIO specified in3GPP TS 25.331, "Radio Resource Control (RRC); Protocol specification (Release 10)", v10.1.0).

Event triggered measurement report

RNC needs to inform both the CSO and absolute USO to UE via e.g. RRC signaling. The UE then sends the triggered measurement report to RNC (how and when to send the triggered measurement report may refer to EVEN 1C, 1D and the like as specified in 3GPP TS 25.331, "Radio Resource Control (RRC); Protocol specification (Release 10)", v10.1.0) in accordance with a result of Formula (3). RNC receives the triggered measurement report and determines whether to change the BF cell of the UE by comparing qualities of difference cells in accordance with the embodiment of the present invention.

When the BF control cell of the UE is different from the serving cell of the UE, the control cell of the UE may be changed by employing the embodiment of the present invention. In this case, RNC needs to inform the UE of CSO specific for the serving cell change (for example, CIO as specified in 3GPP TS 25.331, "Radio Resource Control (RRC); Protocol specification (Release 10)", v10.1.0). The UE needs to send to RNC the triggered measurement report specific for triggering the BF control cell change.

Relative USO:

In a case where the measurement report is periodical For each cell, a cell specific offset CSO representing the cell load level of the cell is multiplied with a relative UE specific offset USO representing the beam-forming capability of the UE to obtain a product. The CPICH quality report $Q_{CPICH}$ of the cell measured by the UE and the obtained product is summed as the cell balancing parameter. The beam-forming control cell is a cell which has a largest cell balancing parameter among the plurality of cells.

For example, a cell balancing parameter e may be expressed in accordance with Formula (4) as follows:

$$e=Q_{CPICH}+USO*CSO \quad (4),$$

wherein $Q_{CPICH}$ represents CHICH quality of a cell, and CSO represents CSO of the cell. Then, a corresponding cell balancing parameter e may be obtained for each cell, so as to determine among the plurality of cells an optimum cell which has a largest cell balancing parameter as BF control cell of the UE. For example, when Cell a is determined as the optimum cell based on a result of comprehensive comparison, BF control cell change or uplink serving cell change from the current Cell b to Cell a may be triggered.

It can be seen from Formula (4) that the relative USO determines how much the UE should adopt the absolute difference in CSO between two cells. This absolute difference reflects how much the UE should follow the coverage difference due to balancing of load difference between the cells, thereby regulating to what extent the UE should contribute to load balancing. The larger the relative USO is, the more the UE should contributes to load balancing (but no more than the level given by the difference in CSO).

As mentioned in the forgoing description, when the BF control cell of the UE is different from the serving cell of the UE, the BF control cell of the UE may be changed by employing the embodiment of the present invention. In this case, different CSOs dedicated to the serving cell change may be employed (for example, CIO specified in3GPP TS 25.331, "Radio Resource Control (RRC); Protocol specification (Release 10)", v10.1.0).

Event triggered measurement report

For each UE, RNC may calculate a composite CPICH offset as CSO*USO and send this composite CPICH offset via the current RRC signaling. The UE then triggers the measurement reports based on the composite CPICH offset, which is in essence according to Formula (4). This process is the same as the manner previously described.

In the forgoing embodiments of the present invention, the uplink intra-frequency load balancing apparatus 200 may be located at a radio network controller RNC for performing the above uplink intra-frequency load balancing. Each of UEs notifies the RNC of the measured CPICH quality report and the determined beam-forming capability of the UE. However, it should be appreciated that the present invention is not limited to this. In another embodiment of the present invention, the uplink intra-frequency load balancing apparatus 200 may be located at each of UEs. A radio network controller RNC notifies each of the UEs of cell load levels of the plurality of cells.

Figure 4:
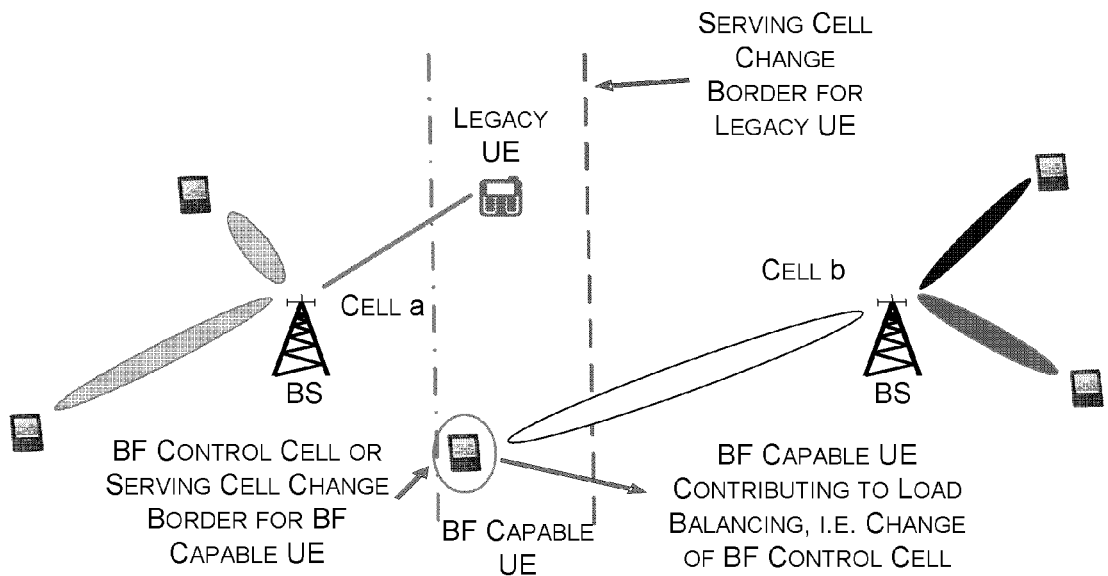
FIG. 4 schematically shows an example on how to improve load balancing by considering UE's beam forming capability in a BF control cell change.

FIG. 4 schematically describes how to improve load balancing by considering UE's beam forming capability in a BF control cell change. As shown in FIG. 4, if there is no load balancing, four UEs are connected in Cell a, while there are only two UEs connected in Cell b. In such an example, Cell b may be determined as the optimum cell by means of the method of the present invention. As shown in FIG. 4, there are two UEs in Cell a, which are relatively close to Cell b, but one is the legacy UE without BF capability and the other has BF capability. In this case, with the method of the present invention, the UE with BF capability may be selected as participating in the load balancing. Correspondingly, BF control cell of the UE is changed to Cell b, and the beam direction of the UE is also directed towards Cell b. In this manner, load difference between Cell a and Cell b may be reduced or even eliminated, thereby achieving uplink load balancing.

Preferably, when the existing UE in CLBF mode in the network cannot achieve load balancing, it is needed to introduce more UEs for achieving load balancing. In this case, the activation unit in the uplink intra-frequency load balancing apparatus 200 may be used to, for a UE which supports the CLBF mode but is not in the CLBF mode, selectively activate the CLBF mode according to at least one of the following activation criteria: activating a UE with a higher beam-forming gain, and activating the CLBF mode for at most m UEs in every n seconds, wherein m and n are configurable parameters. Moreover, the following conditions should be further considered:

Evident load imbalance exists, and

The CLBF capable UE would change BF control cell or serving cell to another cell (i.e. would contribute to load balancing) if the CLBF mode is activated.

This may further include the following steps:

1. For a UE which supports the CLBF mode but is not in the CLBF mode, RNC determines the BF capability of the UE. For example, RNC determines a virtual USO, i.e. determining USO in the manner of Step 303 noted above under an assumption that the UE is in the CLBF mode;
2. RNC comprehensively compares the reported CPICH quality, the determined cell load level and the determined UE's BF capability in the manner of Step 305 noted above. In this case, since the reported CPICH quality is the same as the determined cell load level, RNC substantially determines whether the CLBF mode is activated and whether the UE changes the BF control cell or serving cell to another cell by comparing the currently adopted USO and the calculated virtual USO. In such a step, RNC activates the CLBF mode for the UE according to the existing manners. The detailed description therefor is omitted here.

The foregoing embodiments have given illustrative descriptions on the present invention. The technical solutions according to the present disclosure have the following benefits:

Providing means to effectively exploit BF's benefit in improving uplink load balancing performance;

Allowing the network to control which, when and to what extent the UEs should apply uplink load balancing, which enables the network to achieve an improved load balancing in uplink;

Providing means for the network to conditionally activate CLBF mode for load balancing purpose; and Being easily implemented.

Furthermore, the present disclosure may consider the uplink load level of the cell and the UE's BF capability during the process of changing the BF control cell, while allowing those CLBF capable UEs having large BF gains to greatly contribute to load balancing. Therefore, the present disclosure may effectively utilize benefits of beam forming during the process of improving intra-frequency uplink load balancing.

It should be appreciated that different steps of the above method may be implemented by a programmable computer. Herein, some embodiments also include a machine-readable or computer-readable program storing device (such as digital data storage medium) and coding machine-executable or computer-executable program instructions, which may perform some or all of the steps of the above method. For instance, the program storing device may be a digital memory, a magnetic storage medium such as a magnetic disk and a tape, hardware or optical readable digital data storage medium. The embodiments may include a programmable computer for performing the steps of the above method as well.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method of uplink intra-frequency load balancing, wherein the uplink intra-frequency load balancing can be performed by adjusting a beam direction of a User Equipment (UE), the method comprising:

determining a cell load level of each of a plurality of cells based on an uplink load measurement received from a base station of a corresponding one of the plurality of cells;

determining a beam-forming capability of the UE based on a beam-forming gain of the UE;

calculating a cell balancing parameter for each of the plurality of cells according to a common pilot channel (CPICH) quality report measured by the UE, the cell load levels of the plurality of cells, and the beam-forming capability of the UE, so as to determine a beam-forming control cell, wherein the beam direction of the UE is directed towards a base station antenna of the beam-forming control cell, the beam-forming control cell being a cell which has an optimal cell balancing parameter among the plurality of cells, wherein for two of the plurality of cells referred to as Cell a and Cell b, the calculating step calculates a relative cell balancing parameter of the Cell a with respect to the Cell b as follows:

$$(Q_a - Q_b) + \text{sign}(CSO_a - CSO_b) X \min(\text{abs}(CSO_a - CSO_b), USO),$$

wherein CSO is a cell specific offset, wherein USO is an absolute EU specific offset, wherein $Q_a$ represents the CPICH quality of the Cell a, $Q_b$ represents the CPICH quality of the Cell b, $CSO_a$ represents the CSO of the Cell a, and $CSO_b$ represents the CSO of the Cell b, sign represents "+/−", min represents that a minimum value is taken, X represents a multiplication operator, and abs represents that an absolute value is taken.

2. The method of claim 1, wherein the uplink load measurement comprises a Received Total Wide Band Power (RTWP), a Rise over Thermal (RoT), or a load factor.

3. The method of claim 1, wherein determining the cell load level comprises estimating the cell load level of each of the plurality of cells based on a target load and the uplink load measurement received from the base station of the corresponding one of the plurality of cells.

4. The method of claim 3, wherein estimating the cell load level comprises estimating the cell load level of each of the plurality of cells based on a difference between the target load and the uplink load measurement received from the base stations of the corresponding one of the plurality of cells.

5. The method of claim 1, wherein calculating the cell balancing parameter for each of the plurality of cells comprises, for each of the plurality of cells:
multiplying a cell specific offset (CSO) representing the cell load level of the cell with a relative UE specific offset (USO) representing the beam-forming capability of the UE to obtain a product for the cell; and
summing the CPICH quality report ($Q_{CPICH}$) of the cell measured by the UE and the obtained product to calculate the cell balancing parameter;
wherein the beam-forming control cell comprises a cell having a largest cell balancing parameter among the plurality of cells.

6. The method of claim 5, further comprising calculating the relative USO according to the beam-forming capability of the UE and a determination of whether the UE is in a closed-loop beam-forming (CLBF) mode.

7. The method of claim 6, wherein calculating the relative USO comprises calculating the relative USO in real-time.

8. The method of claim 6:
wherein calculating the relative USO comprises calculating the relative USO as $k(flag_{BCLBF}, Gain_{BF})$, where $Gain_{BF}$ represents the beam-forming gain and $k(*, GainBF)$ represents a monotone non-decreasing function of $Gain_{BF}$ whose range domain comprises [0, 1]; and
wherein when the UE is in the CLBF mode, $flag_{BCLBF}=1$, and otherwise $flag_{BCLBF}=0$.

9. The method of claim 6:
wherein calculating the relative USO comprises calculating the relative USO as $flag_{BCLBF} \times (1-1/M_{ant})^n$, where $M_{ant}$ represents a number of transmitting antennas of the UE and n represents a system configurable integer greater or equal to one; and
wherein when the UE is in the CLBF mode, $flag_{BCLBF}=1$, and otherwise $flag_{BCLBF}=0$.

10. The method of claim 1, further comprising:
if the relative cell balancing parameter of the Cell a with respect to the Cell b is positive, indicating that the cell balancing parameter of the Cell a is more optimal than that of the Cell b, continuing to calculate a relative cell balancing parameter of the Cell a relative to another cell; and
if the relative cell balancing parameter of the Cell a with respect to the Cell b is negative, indicating that the cell balancing parameter of the Cell b is more optimal than that of the Cell a, continuing to calculate a relative cell balancing parameter of the Cell b relative to another cell until the cell which has the optimal cell balancing parameter is selected.

11. The method of claim 1, further comprising calculating the USO according to the beam-forming capability of the UE and a determination of whether the UE is in a closed-loop beam-forming (CLBF) mode.

12. The method of claim 11, wherein calculating the USO comprises calculating the USO in real-time.

13. The method of claim 11;
wherein calculating the USO comprises calculating the USO as $f(flag_{BCLBF}, Gain_{BF})$, where $Gain_{BF}$ represents the beam-forming gain and $f(*, Gain_{BF})$ represents a monotone non-decreasing function of $Gain_{BF}$;
wherein when the UE is in the CLBF mode, $flag_{BCLBF}=1$, and otherwise $flag_{BCLBF}=0$.

14. The method of claim 11:
wherein calculating the USO comprises calculating the USO as
$flag_{BCLBF} \times min(CSO_{max}, -10 \lg M_{ant})$, where min represents that a minimum value is taken, $M_{ant}$ represents a number of transmitting antennas of the UE, lg represents a logarithm operator, and $CSO_{max}$ represents a maximum CSO, which comprises a system configurable parameter; and
wherein when the UE is in the CLBF mode, $flag_{BCLBF}=1$, and otherwise $flag_{BCLBF}=0$.

15. The method of claim 1, wherein the beam-forming capability of the UE depends on the beam-forming gain estimated based on at least one of a number of transmitting antennas of the UE and a pre-coding scheme.

16. The method of claim 1, wherein a larger beam-forming gain is indicative of a stronger beam-forming capability of the UE.

17. The method of claim 1, further comprising:
activating a closed-loop beam-forming (CLBF) mode according to at least one of:
activating a UE with a higher beam-forming gain; and
activating the CLBF mode for at most m UEs in every n seconds, wherein m and n comprise configurable parameters, for a UE which supports the CLBF mode but is not in the CLBF mode; and
if the CLBF mode is activated, the UE supporting the CLBF mode re-determines the beam-forming control cell.

18. The method of claim 1, wherein the method is performed at a radio network controller (RNC), and wherein the UE notifies the RNC of the measured CPICH quality report and the determined beam-forming capability of the UE.

19. The method of claim 1, wherein the method is performed at the UE, and wherein a radio network controller (RNC) notifies the UE of the cell load levels of the plurality of cells.

20. An uplink intra-frequency load balancing apparatus, wherein the uplink intra-frequency load balancing can be performed by adjusting a beam direction of a User Equipment (UE), the apparatus comprising:
a first determination circuit configured to determine a cell load level of each of a plurality of cells based on an uplink load measurement received from a base station of a corresponding one of the plurality of cells;
a second determination circuit configured to determine a beam-forming capability of the UE based on a beam-forming gain of the UE; and
a calculation circuit configured to calculate a cell balancing parameter for each of the plurality of cells according to a common pilot channel (CPICH) quality report measured by the UE, the cell load levels of the plurality of cells, and the beamforming capability of the UE, so as to determine a beam-forming control cell, wherein the beam direction of the UE is directed towards a base station antenna of the beam-forming control cell, the beam-forming control cell being a cell which has an optimal cell balancing parameter among the plurality of cells, wherein for two of the plurality of cells referred to as Cell a and Cell b, the calculating step calculates a relative cell balancing parameter of the Cell a with respect to the Cell b as follows:

$$(Q_a - Q_b) + \text{sign}(CSO_a - CSO_b) X \min(\text{abs}(CSO_a - CSO_b), USO),$$

wherein CSO is a cell specific offset, wherein USO is an absolute EU specific offset, wherein $Q_a$ represents the CPICH quality of the Cell a, $Q_b$ represents the CPICH quality of the Cell b, $CSO_a$ represents the CSO of the Cell a, and $CSO_b$ represents the CSO of the Cell b, sign represents "+/−", min represents that a minimum value is taken, wherein X represents a multiplication operator, and abs represents that an absolute value is taken.

* * * * *